United States Patent [19]

Warwicker

[11] 4,028,451
[45] June 7, 1977

[54] METHOD OF MAKING WATER VAPOR PERMEABLE POLYMER SHEET MATERIAL

[75] Inventor: Eric Albert Warwicker, King's Lynn, England

[73] Assignee: Porvair Limited, King's Lynn, England

[22] Filed: Feb. 5, 1975

[21] Appl. No.: 547,125

Related U.S. Application Data

[62] Division of Ser. No. 329,410, Feb. 5, 1973, Pat. No. 3,873,254, which is a division of Ser. No. 42,793, June 2, 1970, Pat. No. 3,729,536.

[30] Foreign Application Priority Data

June 3, 1969  United Kingdom ............ 28076/69

[52] U.S. Cl. ................. 264/45.8; 264/49; 264/216
[51] Int. Cl.² ........................ B29D 27/04
[58] Field of Search ............ 264/41, 212, 216, 217, 264/49, 45.8

[56] References Cited

UNITED STATES PATENTS

| 1,133,548 | 3/1915 | Foltzer ........................ 264/217 X |
| 3,207,828 | 9/1965 | Petersen et al. ............... 264/216 X |
| 3,432,585 | 3/1969 | Watson et al. ................. 264/212 X |
| 3,524,753 | 8/1970 | Sharp ........................... 264/216 X |
| 3,729,536 | 4/1973 | Warwicker ..................... 264/41 |
| 3,791,997 | 2/1974 | Hathorn et al. ................ 264/49 X |
| 3,860,680 | 1/1975 | Warwicker et al. ........... 264/41 |
| 3,873,254 | 3/1975 | Warwicker ..................... 264/41 X |

FOREIGN PATENTS OR APPLICATIONS

| 70,925 | 1/1931 | Sweden .......................... 264/217 |
| 492,370 | 9/1938 | United Kingdom ............ 264/217 |
| 552,770 | 4/1943 | United Kingdom ............ 264/212 |

*Primary Examiner*—Philip Anderson
*Attorney, Agent, or Firm*—Abner Sheffer

[57] ABSTRACT

Coagulation apparatus for producing thick microporous polyurethane sheet material by passing a layer of polymer solvent composition beneath a close spaced plate with liquid non-solvent fed to the gap between the plate and the surface to produce controlled initiation of the coagulation.

4 Claims, 2 Drawing Figures

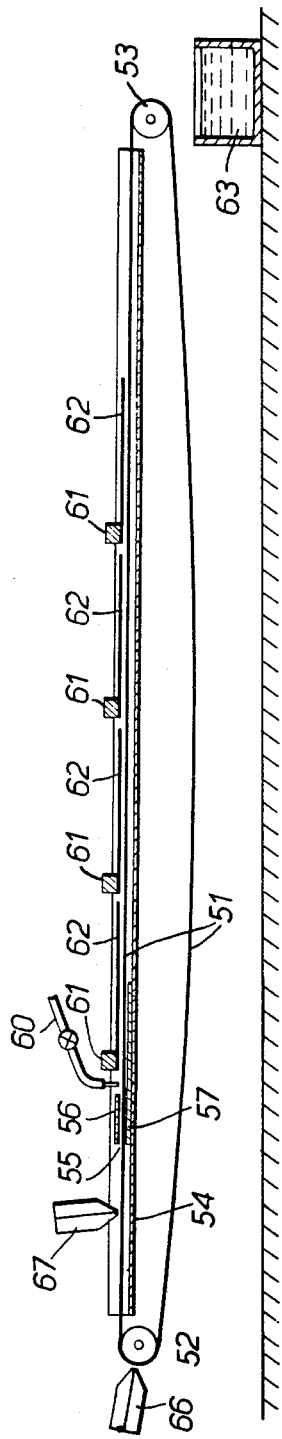
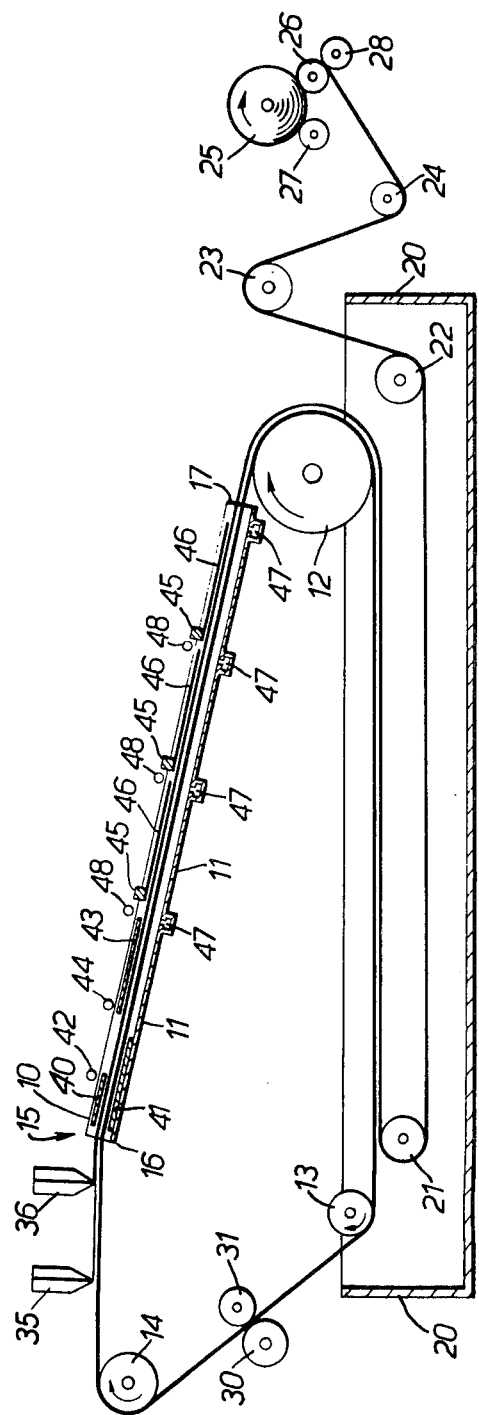
FIG.1.
FIG.2.

METHOD OF MAKING WATER VAPOR PERMEABLE POLYMER SHEET MATERIAL

This is a division, of application Ser. No. 329,410, filed Feb. 5, 1973, and now U.S. Pat. No. 3,873,254, which in turn is a division, of application Ser. No. 42,793, filed June 2, 1970, and now U.S. Pat. No. 3,729,536.

The present invention relates to methods of making microporous polymer materials particularly but not exclusively materials free from preformed fibrous sheet reinforcement.

The invention is concerned with microporous polymer materials which are produced by coagulating layers of polymers extended with liquid vehicles, for example, polymer solutions, gels or colloidal dispersions with liquid non solvents. It has been suggested that the non solvent can be applied to the surface of the layer of polymer solutions as a vapour, but this is not feasible for relatively thick layers e.g. 0.5 millimeters upwards, or as a spray but this produces an uneven surface. The more usual method is to pass the layer on a support with the suppot uppermost into a bath of the liquid non solvent.

This presents considerable problems in conveying the material through the bath especially in a continuous process since the polymer layer may require a substantial period of time e.g. of the order of ½ hour before the polymer surface can be conveyed around a roller without a surface blemish being produced.

The applicants have observed that attempting to pass the layer on a support with the layer uppermost into a bath of liquid non solvent brings a number of problems. Thus the passage of the material into the bath of liquid and plant vibrations tend to set up ripples in the surface of the bath and these can often cause surface patterns which have a adverse effect on the appearance of the material and render it unsuitable for use as high grade man-made leather like material.

Thus an object of the present invention is to provide a process adapted to continuous operation to produce a material of consistently good appearance.

A further object of the present invention is the utilization of a compact and simple plant for carrying out the said process.

The present invention finds a particular application in the production of relatively thick polymer layers free from preformed fibrous sheet reinforcement for example from 0.5 millimeters up to as thick as 5 millimeters or more and especially to the production of layers having a thickness making them suitable for use as shoe upper materials for example 0.8 millimeters to 1.5 millimeters preferably 0.8 to 1.1 millimeters for women's weight shoes and 1.1 to 2.5 millimeters preferably 1.5 to 1.8 millimeters for men's weight shoes.

In order to produce such materials in vapour permeable or microporous form from a layer on a support of solutions of polymers for example polyurethanes, in organic hygroscopic or hydrophilic solvents, for example N,N dimethylformamide, the said solutions containing microscopic water soluble particles, for example ground sodium chloride, by coagulation with liquid non solvents for example water or water solvent blends, the layer when immersed support uppermost in the aqueous solution needs to remain immersed for about ½ to 1 hour to achieve coagulation of the polymer to self supporting form when the finished layers are to be about 1.5 to 2 millimeters thick. Longer periods are required for thicker layers and vice versa.

At speeds of entry into the non solvent through an unstabilized surface with the polymer sheet uppermost or less than 10 to 15 feet per minute surface patterns due to ripples are very likely to occur on the surface of the coagulated polymer layer. Until the material has been immersed in non solvent for at least ½ hour, it cannot be conveyed around a roller without the material being damaged. The present invention enables low speeds for example 1 to 3, 5 or 10 feet per minute to be used resulting in shorter production lines and substantial savings in space and cheaper plant.

The applicants have discovered that many of these problems can be overcome if the layer of polymer extended with liquid vehicle is arranged uppermost on a support and liquid non solvent in continuous form applied thereof. This is carried out at least for long enough to coagulate the immediate surface. The remainder of the coagulation can be carried out in the same or similar way even by spraying or by immersion in the conventional manner.

The applicants have also discovered that this application of non-solvent can be particularly conveniently carried out if a layer of polymer solution on a support is passed through a gap or slot and the gap or slot is sufficiently narrow for a stabilized meniscus to be set up between the upper surface of the layer and the adjacent wall of the slot when liquid non-solvent is supplied therebetween. The surface of the material can be coagulated in this way with a smooth surface and the coagulation can be completed thereafter either by continued treatment with a thin layer of non-solvent held smoothly against the coagulated surface as by overlying spaced plates or trailing flexible sheets, or by immersion of the layer in a conventional bath of non-solvent.

Moreover this enables the layer to be coagulated whilst supported uppermost on a support, the support can thus easily be conveyed through the process and the conveying problems and the requirement for large tanks of non-solvent associated with upside down coagulation can be avoided.

The present invention also enables much smaller volumes of non-solvent to be used for the coagulation and attendant removal of the bulk of the liquid vehicle or solvent. This reduces the scale of operation needed for solvent recovery, allows the composition of the non-solvent liquid to be more readily controlled, and makes it possible should it be desired for a wide range of non solvents such as alcohols glycols, ketones and other non solvent liquids other than pure water to be used including those containing dissolved solids having non solvent action such as inorganic salts for example ammonium compounds such as ammonium nitrate. The smaller volumes required both reduce the capital cost of the non solvent and fire risks and other hazards.

Whilst the process and apparatus is particularly suited to the production of unreinforced microporous polymer layers its advantages will also be obtained in the production of reinforced layers. Thus when a "sheet of polymer extended with liquid vehicle" or "polymer extended with liquid vehicle in sheet form" is referred to both unreinforced and reinforced polymer compositions are included within the term unless otherwise stated. Thus the invention is applicable to the coagulation of polymer extended with liquid vehicle not only when the polymer composition exists as a single homogeneous layer but also when it exists as a number of superposed layers of varying conpositions for example varying in polymer, pigment, stabilizer or other component nature or content, as also when the polymer composition forms a coating on or is impregnated into reinforcing sheets for example of woven, non woven or knitted fibrous material and especially needle punched polymer impregnated felts such as described in U.S. Pat. Nos. 3,100,721 and 3,067,482.

Thus according to one aspect of the present invention a method of making a water vapour permeable, preferably microporous, polymer sheet material comprises at least initiating the coagulation of polymer extended with liquid vehicle in sheet form, preferably arranged uppermost on a support, by applying liquid non-solvent in continuous form to at least one surface of the said sheet, desirably by forming a continuous, desirably thin, layer of liquid non-solvent extending across the width of the sheet on the said surface of the said sheet, preferably by moving the said sheet past means for forming the said layer. Preferably the application of non-solvent is carried on at least long enough to coagulate the immediate surface of the layer i.e. so that a surface skin is formed and the layer is no longer sticky to the touch.

The liquid non-solvent is applied by means which are held out of contact or do not come into contact with the free surface of the polymer layer. Thus the surface remains flat and smooth and does not conform to the profile of the means which apply the liquid non-solvent, i.e. these means do not exert pressure on the surface of the layer such as to conform or modify the configuration of the surface.

According to another aspect of the invention a method of making a water vapour permeable preferably microporous polymer sheet material comprises coagulating at least one surface of a sheet comprising polymer extended with liquid vehicle by causing continuous relative movement of the said sheet with respect to the body of coagulating liquid, a surface of the said sheet coming into contact with the said body of coagulating liquid along a line of contact bounding an exposed surface of the said body of liquid while the said liquid surface is stabilized along a line spaced from the said surface of the sheet not more than 1 centimeter and preferably in the range 0.1 to 8 millimeters especially 2 to 7 millimeters.

Preferably the said liquid surface is stabilized by the presence of a solid boundary located along the said spaced line. Desirably the distance between this said boundary and the surface of the sheet is such as to enable a meniscus of non-solvent liquid to form therebetween.

The distance between the solid boundary and the surface of the said sheet is desirably maintained substantially constant during the relative movement which conveniently consists of the sheet being moved past the body of liquid.

Reference has been to the relative movement being "continuous." The use of this term is not intended to mean that the movement persists indefinitely but merely is carried out for substantial periods of time e.g. numbers of hours or days rather than minutes and more importantly that it is not intermittent and is of substantially constant speed during a given period of operation of the process. Clearly, however, the speed can vary from run to run depending on the relevant factors involved in the particular run.

The continuous layer of liquid non-solvent can be formed by a variety of means through a preferred form of apparatus utilizing a close spaced plate and the surface tension of the non-solvent is described below.

In the preferred form of the invention the body of liquid can be considered as a layer located between the plate and the sheet. However the exact length of this layer of non-solvent in the direction of relative movement of the sheet and the means forming the layer of non-solvent, the machine direction, can vary though in the preferred embodiment this first layer is some 15 to 30 cms (6 to 12 inches) long.

This body of liquid may constitute a layer but should have a defined linear upstream boundary preferably stabilized at least against macroscopic movement so that any movements in the non-solvent subsequently in contact with the sheet are substantially prevented from reaching the said upstream boundary where the coagulation commences.

Whilst the plate and slot arrangement described below is found to produce very satisfactory results and is preferred the body of liquid or layer may not need to extend any finite length in the machine direction so long as a defined thin linear region of non solvent is established. Thus a bar extending across the sheet in close spaced relationship could be used as could be a porous pipe similarly spaced and fed with liquid non solvent or a spaced calendar roll rotating with the same surface speed as the sheet in the same direction.

Also the non solvent could be fed evenly onto the surface from a slit extending across the sheet which would be inclined so that the liquid would flow in the same direction as the sheet was moving. The non-solvent could also be thickened with suitable thickening agents and extruded onto the sheet, the thickening agents being removed subsequently in the coagulation.

However the specific embodiments described hereafter are preferred to these alternatives.

It has been mentioned above that the continuous layer of non solvent used to initiate coagulation is desirably thin and that it is preferred that the coagulation is completed by maintaining a substantially continuous and again desirably thin layer of non solvent on at least the free surface.

The thickness of the layer of non solvent is not thought to be critical and can be as thin as desired in order, for example, to reduce the volume of liquid from which the solvent will have to be recovered provided that it is adequate to meet the sheet's requirements to achieve even coagulation as rapidly as possible.

Thus the layer does not need to be thicker than 1 centimeter thick and can be as thin as 0.1 millimeter though at this thickness it may become difficult to maintain the layer in substantially continuous form. A useful and readily achieved thickness for the non-solvent layer is in the range 1 to 5 millimeters particularly when water containing up to 10% w/w of dimethylformamide is used as the non solvent. A wetting agent may usefully be added to the non-solvent to assist in the maintenance of the layer of non-solvent.

Another advantage of the use of a thin layer of non solvent rather than a bath of non solvent is that the concentration of liquid vehicle or solvent in the non solvent more rapidly reaches a level at which solvent recovery is economically feasible and thus the non solvent need be used for shorter periods of time and can be kept more pure, than is the case when baths of non solvent are used, with attendant plant and process advantages.

The support may be made of any material which is sufficiently flexible to run through the process and has sufficient solvent and temperature resistance to withstand the process conditions and also is such that the polymer layer adheres to its surface at least sufficiently to produce a flat layer on the surface of the support.

The support can thus comprise woven, knitted or non-woven textile materials, flexible polymer sheet materials and flexible metal materials such as wire gauze. The textile materials are preferably made from polyester fibres though any other solvent resistant fibre could be used.

When woven supports having a regular array of holes are used the support preferably has the following characteristics. The support preferably has a stiffness (as herein defined) in the transverse or weft direction in excess of (S¼) 0.6 and (S½) 0.9 preferably 0.8 and 1.3 and especially 1.8 and 2.2 whilst beng flexible in the longitudinal direction, a support area (as herein defined) in excess of 50%, preferably 60% and especially 70 to 95% and at least 500 passages per square inch, preferably 1000 and especially 5000 to 10,000, providing communication from face to face of the support.

Stiffness is measured using the three point beam loading method. The span of the sample between the two knife supports is 3.8 centimeters and the load rate used is 10 millimeters per minute and is applied downwardly to the centre of the sample. Stiffness (S¼) is defined as the load in Kgs required to prouce a ¼ centimeter deflection and stiffness (S½) is defined as the load in Kgs. required to produce a ½ centimeter deflection.

Support area is defined as the % of the total area of the surface of the support which is occupied by the material of the support and is within 0.5 millimeters of the surface. With woven fabrics there may be primary and secondary support areas and the sum of these is the support area as defined herein. Primary support is the area provided by the warp threads (and possibly also weft in a plain weave) at the highest points in the surface and is the % of the total area provided by such threads above a plane passing through their mid points at the highest points in the surface. Secondary support is the % of the total area less the primary support provided by all threads above a plane passing through the mid points of the weft threads at their point of nearest approach to the surface.

Thus in general terms primary support except in plain weaves is provided by the warp threads and secondary support by the weft threads. In plain weaves weft and warp both contribute and there is no secondary support.

The support can be porous or non-porous but if it is non-porous the surface is preferably treated as by roughening it to produce a surface key for the polymer layer. Whilst the process is applicable to the production of permanent coatings on supports, it finds particular application in the production of unsupported sheet materials and in this case the support must be one from which the coagulated polymer layer can readily be stripped without being damaged.

This stripping stage may result in a desirable drawing out of the inner surface of the material imparting a smooth fibrous appearance to it having in certain cases marked resemblance to the flesh surface of a leather produced from a natural hide, thus obviating the need for a shoe lining when the articles are used as shoe uppers.

One particular material, which is both self supporting and has a degree of flexibility and gives a very good flesh surface appearance, is a porous liquid permeable sintered polymeric plastics material especially one made from high density polyethylene and preferably having an average pore size of 50 microns or more broadly 25 to 100 microns as measured by the method described in B.S.S. 1752;1963 using n propyl alcohol. Such a material is sold under the name VYON (Trade Mark).

Preferably the support at least at its edges is such as to provide a key for the polymer sheet such that the force required to remove the sheet from the keyed area is below the breaking strength of the self-supporting sheet at the time at which the sheet is removed from the support, but in the range 50 to 2000/grams per centimeter width, especially 90 to 1400 grams per centimeter width.

The sheet can be removed immediately after coagulation or after being leached when a filler is used or after being dried.

The degree of adhesion can be controlled by wetting the support before the layer is formed on it either with solvent or liquid vehicle or with non-solvent liquids either pure non-solvent or non-solvent/solvent blends having non-solvent action. Thus the support desirably is treated so as to have an even non-solvent content prior to the application thereto of the sheet of polymer extended with liquid vehicle so as to ensure even penetration of the support and that any coagulation caused by the non-solvent content of the belt is also even. The support may thus carry an amount of non solvent liquid prior to the application of the layer of polymer to it so as to ensure that in conjunction with the surface properties of the support the layer of polymer adheres to the support without curling away from it but is still capable of being stripped from the support without rupturing once the polymer has been coagulated to self-supporting form.

The support preferably carried 50 to 80% by weight based on its own weight of the non-solvent liquid. The non-solvent liquid may comprise 5 to 40% of the liquid vehicle the balance being the liquid non-solvent.

Reference has been made to the polymer layer on the support being passed through a surface of liquid non-solvent which surface is stabilized against movement. The word through is not to be taken as excluding the case where the surface of the polymer layer forms one boundary of the stabilized surface and indeed this is the most convenient way of carrying the invention into practice.

Thus, according to a further aspect of the invention a method of making a water vapour permeable polymer sheet material comprises forming an initial mixture comprising polymer extended with liquid vehicle, forming a layer of the initial mixture on a support passing the layer on the support past coagulating means for establishing a thin continuous layer of non solvent across the polymer layer with a stabilized upstream boundary and establishing such a layer of non-solvent on the surface of the said polymer layer. As mentioned above the invention also extends to apparatus for carrying out the process of the invention.

Thus according to this aspect of the invention apparatus for coagulating polymer extended with a liquid vehicle in sheet form on a support which may be porous or non-porous comprises first means for evenly applying liquid non-solvent in continuous form across the full width of the said sheet at least to the free surface of the said sheet irrespective of the orientation of the said sheet on the support, and drive means arranged to move the said sheet on the support past the said coagulating means. Preferably the support is arranged to have the sheet on its upper surface and the coagulating means are arranged to establish a continuous layer of liquid non-solvent across the full width of the sheet. Desirably the cogulating means are such that the upstream boundary of the layer of liquid non-solvent is substantially stabilized against movement. Thus the coagulating or first means may utilize the surface tension of the liquid non-solvent to stabilize its upstream boundary.

Thus the apparatus desirably includes coagulating means for establishing a thin continuous layer of liquid non-solvent across a surface whilst the said surface passes the coagulating means, the said thin layer of liquid having a stabilized upstream boundary in the sense of movement of the said surface, means for forming a layer of an initial mixture on a support the surface of the layer remote from the said support comprising the said surface, and means for passing the layer on the support past the said coagulating means so that the said layer of liquid non-solvent is established and the said surface of the initial mixture is coagulated.

The first or coagulating means may comprise a plate positioned in close-spaced relationship to the free surface of the sheet so as to form a slot therebetween and means for supplying non-solvent so as to keep the slot filled. The thickness of the slot is desirably such that when non-solvent is supplied to the downstream end of the plate the surface tension of the liquid establishes a meniscus, adjacent to the upstream end of the plate, between the plate and the free surface of the sheet on the support.

The coagulating means preferably comprise a strip or plate arranged transverse to the direction of travel of the support and adjustably spaced from the surface of the support so that a slot can be produced such as to enable a meniscus to be set up in the gap between the strip or plate and the surface of the polymer layer remote from the support. A further plate is preferably arranged beneath the support. The non-solvent supply means preferably comprise porous tubes extending across the width of the plate. These are preferably placed above the downstream end of the plate.

They are conveniently made of the sintered high density polyethylene VYON (Trade Mark) material described above.

They have the advantage of filtering the non-solvent supply and providing an even feed and are cheap and can thus be easily replaced.

As mentioned above in a preferred form of this aspect of the invention the thin layer of non-solvent is maintained on the surface of the layer of polymer on the support until the said layer of polymer is substantially completely coagulated to self-supporting form.

This is preferably achieved by arranging the support to run over an elongated tray with spaced plates or sheets arranged over the support and a non-solvent supply arranged to maintain the said thin layer of non-solvent in the gap between the said plates or sheets and the said surface of the polymer layer. The sheets may be freely floating on the layer of non-solvent and may be merely secured at their upstream end.

The non-solvent may be provided at a number of stations spaced down the tray with drain slots across the tray prior to the next inlet station. The arrangement can then run on a countercurrent basis by feeding the outflow from each stage to the inlet of the preceding upstream stage. This arrangement enables a controlled concentration gradient of solvent and non-solvent to be set up, and controlled at any desired level.

This enables the procedures disclosed in U.S. Pat. No. 3,208,875 to be readily carried out. However, whilst these may be desirable for certain systems of polymer extended with liquid vehicle as disclosed in that document they are not essential to the satisfactory coagulation of the polymer-removable filler-solvent pastes preferred for use in the present invention.

The plate may be at a slight angle to the horizontal so that the support passes downwardly beneath the plate, the angle being such that the meniscus can be established merely by supplying non-solvent on to the polymer surface adjacent to the downstream edge of the plate.

Preferably means are provided to maintain the free surface of the said sheet at least wetted with non solvent until the polymer is substantially completely coagulated.

These means may comprise at least one covering sheet positioned above the polymer layer downstream of the plate so as to establish and maintain a thin film of non-solvent evenly over the surface of the polymer layer.

The method and means by which the layer of non-solvent is maintained can be varied. Thus fine sprays or mists could be used to keep the surface wet but care would have to be taken to ensure that the wetting was even across the full width of the layer and for its full length until fully coagulated.

In another form of the invention the apparatus comprises means containing a body of liquid non solvent, means for introducing the sheet on the support into the body of liquid non solvent at a substantial angle to the horizontal, plate means arranged to extend above the surface of the body of liquid non solvent so as to produce a slot between the free surface of the polymer sheet on the support and the plate, the slot being of such dimensions that in conjunction with the height of the plate above the still surface of the body of liquid non solvent any ripples which are produced in the body of liquid as by the passage of the support into it are dampened out at the meniscus produced adjacent to the top of the plate between the free surface of the polymer sheet and the plate.

In a preferred form of the invention means are provided to maintain both the free surface of the said sheet and the free surface of the said support at least wetted with non solvent until the polymer is substantially completely coagulated.

The polymer is preferably dissolved in solvent but the term polymer extended with liquid vehicle is intended to cover systems in which the polymer is in emulsion, colloidal or gel conditions as well as those in which it can reasonably be described as being in solution. Such colloidal or gel conditions are conveniently achieved by addition of non-solvent to a polymer solution. Examples of this method are disclosed in U.S. Pat. No. 3,100,721 and 3,190,765. However, any method, such as addition of an electrolyte, as disclosed in U.S. Pat. No. 3,491,053, which reduces the solubility of the polymer in the solvent can be used to achieve a colloidal or gel condition.

The disclosures of these four specifications are incorporated herein by reference.

The non-solvent is preferably removed, as by drying, subsequent to the removal of the solvent, it merely being necessary that, whilst any solvent remains such as could cause disadvantageous reduction in permeability sufficient non-solvent remains to prevent this happening for example by using a non-solvent with a higher boiling point than the solvent.

If the viscosity of the system is insufficient to enable sufficiently thick coatings to be formed it can be increased by cooling the mixture or adding thickening agents or by other conventional means.

A high vapour permeability was mentioned above as being desirable in shoe uppers for certain uses. Whilst a degree of porosity can occur when a layer of a polymer solution is bathed with a non-solvent for the polymer miscible with the solvent, the pores formed whilst imparting some vapour permeability are liable to be not predictably or evenly distributed and may vary widely in size depending on a wide range of parameters.

An even fine pore size can be ensured by distributing evenly through the polymer solution finely divided particles of a removable filler, for example a solid powder of an inorganic salt, which remain solid in the polymer solution or are arranged to be in a finely divided solid state whilst the polymer is coagulated and are removed at that time or thereafter for example by a leaching agent.

Preferably the ratio in parts by weight of removable filler to working material in the initial mixture is in the range 1.5 to 1 up to 3.0 to 1 preferably about 1.7 to 1 up to 2 to 1 and the ratio in parts by weight of working material to solvent in the initial mixture is in the range 20:80 to 40:60, for example 25:75 to 35:65. Preferably the filler is ground so that more than 50% of the particles have diameters in the range 4 to 20 microns.

It will be appreciated that the variation of the parameters of polymer concentration and removable filler concentration for a given polymer concentration, i.e. filler to polymer ratio will affect the properties of the article, an increase in filler to polymer ratio and a decrease in polymer concentration tending to produce a more open i.e. more permeable structure.

Thus, if it is wished to produce a strong essentially microporous material with essentially no macropores visible to the unaided eye, for example using a thermoplastic essentially linear polyurethane derived from a polyester by reaction with a diol and a slight excess of diisocyanate dissolved in dimethylformamide and using sodium chloride as the removable filler and water as the leaching agent, then the polymer concentration is desirably in the range 25 to 35% w/w, especially about 30% w/w and the filler to working material ratio is preferably in the range 1.5 to 1 to 2.0 to 1 in parts by weight.

If it is wished to produce a more open and plump material having a substantial number of macropores which result in softer more resilient material then using the same system the filler polymer ratio is selected to be about 0.5 to 1.

It will be appreciated that the leaching agent for the filler does not need to be the same as that for the solvent, thus for example when the solvent is dimethylformamide, it could be removed by methanol and the filler for example sodium chloride could be removed with water.

The polymer can be any organic resin material which is capable of forming a film on coagulation from an emulsion, a colloidal dispersion, a gel or a solution, whether the film is water vapour permeable or not.

The polymer must also be capable of undergoing the various processes specified in the methods described below. However, when the product is intended for use as a man-made leather-like material an elastomeric polymer is preferably used. The particular strength and wear characteristics required for the end use of the man-made leather-like material will determine the particular polymer to be used.

For shoe uppers high abrasion resistance and tear strength combined with a reasonable extensibility and initial modulus to provide proper wear comfort on the foot are required.

Many thermoplastic polymers can be used, for example polyvinylchloride and its copolymers, acrylonitrile polymers and copolymers and polyurethanes or blends of one or more of these.

The elastomeric polyurethane may be used on its own or as blends with minor proportions say up to 49% preferably less than 20% of polyvinyl chloride and other polymers and copolymers such as nitrile rubbers including solid copolymers of butadiene and acrylonitrile.

Other polymers which have been suggested for use in man-made leather-like materials include polyacetal resins, vinyl halide polymers (including copolymers with other ethylenically unsaturated monomers), polyamides, polyesteramides, polyesters, polyvinyl butyral, polyalphamethylstyrene, polyvinylidene chloride, polymers of alkyl esters of acrylic and methacrylic acids, chlorosulphonated polyethylene, copolymers of butadiene and acrylonitrile, cellulose esters and ethers, polystyrene and other polymers made from monomers containing vinyl groups.

The preferred polymers however are elastomeric polyurethanes having recovery properties intermediate between pure rubbers and pure thermoplastic materials at room temperature.

The article by Schollenberger Scott and Moore in "Rubber Chemistry and Technology" Vol. XXXV, No. 3, 1962, pages 742 to 752 at page 743 and in FIG. 3 indicates the long so-called half lives of the polyester urethanes mde from adipic acid, 1,4 butane diol and diphenyl methane - p,p' -diisocyanate by the methods disclosed in U.S. Pat. No. 2,871,218 and sold under the Trade Mark ESTANE 5740. These two disclosures are incorporated herein by reference.

Polyurethanes may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate, with a small addition of a difunctional low molecular weight reactant. The last mentioned component may be added either with the other reactants at the start of a one-step polymerisation or at a later stage when it will act primarily as a chain extender.

This type of polyurethane having thermoplastic properties is particularly preferred for use in producing shoe uppers. Particularly preferred polyurethanes are those derived from polyesters by reaction with diols and diisocyanates. As is known from U.S. Pat. No. 2,871,218, mentioned above, many different polyesters, diols and diisocyanates can be used, but a particularly suitable polyurethane system is one in which a polyester made from ethylene glycol and adipic acid is reacted with 1,4-butylene glycol and with 4,4'-diphenylmethane diisocyanate.

In the system in accordance with the above specification the mole ratio of polyester and diol can vary between quite wide limits but the combined mole ratio of polyester and diol is arranged to be essentially equivalent to the mole ratio of diisocyanate so that the resultant polymer is essentially free of unreacted hydroxyl or isocyanate groups.

Polymers of this type but having an improved Shore hardness can be made by using a slight excess of diisocyanate and also be using a copolyester as by replacing part of the ethylene glycol in the above system by 1,4-butylene glycol.

A further alternative polyurethane system which has been found particularly suitable uses polyesters derived from caprolactones.

The polymers may be produced by a bulk polymerization process and subsequently dissolved in suitable solvents or may be prepared directly in solution by a solution polymerization process.

The polymer can include conventional stabilizers, fillers, processing aids, pigments, dyes, additives and surface active agents for example proofing or wetting agents.

Any material which is essentially insoluble in the solvent for the polymer and is inert to the solvent and the polymer but which is soluble or can be rendered soluble by a liquid which has no deleterious effects on the polymer can be used as the removable filler. However, inorganic salts such as ammonium sulphate and particularly sodium chloride are preferred because of their ready availability and the ease with which they can be converted to a finely divided form. The use of such temporary fillers has the added advantage that the mixture containing such fillers has a substantially higher viscosity than the polymer solution or polymer extended with liquid vehicle and this facilitates the formation of thick layers. Whilst the preferred method of coagulating the polymer is to wash it or immerse it in a liquid non-solvent for example water or water solvent blends for example of up to 40% or more dimethylformamide concentration any other liquid coagulating method can be used which deposits a continuous though water permeable layer. Such other methods include using a liquid non-solvent containing high concentrations of dissolved electrolytes, for example 15% or higher aqueous sodium chloride solution. The removable filler material is preferably microscopic particulate material which preferably can be removed by dissolution or thermal decomposition. In place of or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution at least at the stage when the polymer is coagulated, for example urea, and which can either be dissolved out by treating the coagulated sheet with water or other suitable solvent for the particles which is a non-solvent for the polyurethane or can be otherwise destroyed or removed; examples of such particles are sodium carbonate, oxalic acid, ammonium carbonate, or suitable microballoons. Alternatively the void-forming particulate material may be in the form of dispersed microscopic droplets of a liquid insoluble in the solution of polyurethane or in the form of dispersed microscopic bubbles of gas.

Additionally the pore formation could be controlled by dispersing removable or permanent fibrous fillers such as polyvinyl alcohol fibres or polyamide fibres or by incorporating permanent particulate fillers, such as silica, preferably a very small particle size for example less than 1 micron.

When a removable filler, such as sodium chloride, is used the pore size of the resultant water vapour permeable material depends to some extent on the particle size of the removable filler in the paste and if a microporous material is to be made then none of the filler particles must be larger than 100 microns, and preferably most are substantially smaller, for example less than 50 microns typically in the range 1 to 40 or 3 to 20 microns.

Many solvents are known for organic polymers and any suitable one can be chosen for the particular polymer used and preferably an organic solvent is used. However, for elastomeric polyurethane, N,N'-dimethylformamide, dimethyl sulphoxide, N-methyl pyrrolidone, dimethylacetamide and tetrahydrofuran are particularly useful. Dimethylformamide, dimethyl sulphoxide and the other solvents can be diluted with other cheaper solvents such as toluene and methylethylketone which although not solvents for polyurethanes on their own do not act as non-solvents when mixed with dimethylformamide or the other solvents mentioned above.

The invention may be put into practice in various ways and two specific embodiments will be described by way of example with reference to the accompanying diagrammatic drawings in which FIG. 1 shows a longitudinal cross section schematic diagram of apparatus in accordance with the invention, FIG. 2 shows a longitudinal cross section of a simple continuous process embodiment of apparatus in accordance with the present invention.

THE APPARATUS SHOWN IN FIG. 1.

This consists of an endless conveyor belt 51 of woven polyester fabric 3 feet wide passing around an idler roller 52 and a driven roller 53 in a clockwise direction.

The dry belt is about 1.5 millimeters thick, weighs 107 grams per square foot and is made from polyester multifilament fibre (TERYLENE - Trade Mark) in a close woven twill weave. It has a 0.2% stretch at 10 pounds pull per inch width 1.2% stretch at 50 pounds and 6.6% stretch at 100 pounds. Its breaking point is at 327 pounds at which stage the stretch 21.7%.

These results were measured using an Instron tensile testing machine at 1000% extension per minute as described below. The belt is a thick dense but flexible material.

The upper part of the belt runs through a gently inclined tray 54 about 40 feet long. At the upper end of the tray the belt passes through a slot 55 formed between parallel glass plates 56 and 57. The lower plate 57 is about 2½ feet long and the upper plate 56 is about 6 inches long and is adjustably mounted so that the thickness of the slot 55 can be varied. A spray 60 or tap connected to a supply of water of other liquid non solvent is positioned just downstream from the upper plate 56. Four cross bars 61 carrying trailing polyethylene sheets 62 about 6 feet long are positioned evenly across the tray the first one starting immediately below the spray 60. A tank 63 to receive the liquid flowing off the end of the tray 54 is positioned below the roller 53. The appartus also comprises a reactor vessel for preparing polyurethane in solution and pipework, storage tanks pumps and mixing apparatus for distributing microscopic salt particles, stabilizers and other processing aids evenly through the polymer solution to produce one or more pastes and then delivering the pastes to one or more extrusion dies located adjacent to the upper end of the tray 54.

The apparatus shown in FIG. 1 is provided with two 30 inches wide so-called coathanger extrusion heads 66 and 67 so that a single or double layer of paste can be formed on the belt as desired. The rate of feed of the paste to the heads is adjusted to give the required wet coating thickness for example in the range 0.1 millimeters to 3.0 millimeters for each layer e.g. 0.1 or 0.5 to 1.0 for the top layer and 0.7 or 1.2 to 1.8 or 2.5 for the substrate layer. The head 66 will be referred to as the substrate head and the head 67 will be referred to as the topcoat head.

The apparatus is used as follows. A polyurethane is formed in solution in dimethylformamide from a polyester by reaction with a diol and diisocyanate under an inert atmosphere as described in more detail in Example 1. The polyurethane solution containing approximately 30% by weight of resin solids is mixed with microscopic sodium chloride particles about 2 (e.g. or in the range 1.0 to 2.5) parts by weight per part by weight of resin and with small amounts of stabilizers and pigment. This substrate paste is evenly mixed and deaired and fed to the die 66 to produce a layer of about 0.070 inches (1.8 mm) wet thickness on the belt 54. A top coat paste is formed in similar manner but contains 3 (e.g. in the range 2.5 to 5 or 6) parts of sodium chloride per part of resin and is fed to the die 67 to produce a layer of about 0.030 inches (0.76 mm) wet thickness on top of the substrate layer. The belt contains 50 to 80% preferably about 70% non-solvent liquid, e.g. water, by weight just prior to the first head 66. The composition of this liquid is usually predominantly water but it may contain from say 5 to 40% by weight of dimethylformamide and preferably 10 to 20% by weight. The layers on the belt are then passed at 1 foot per minute through the slot 55. Water at 5° to 60° C in this case about 15° C is supplied to the spray 60 at a rate sufficient to maintain the gap between the top surface of the paste layers and the underside of the plate 56 filled with liquid. This gap is arranged to be about 1 to 3 millimeters, in this case 1/16 inch or 1.6 millimeters thick so that a stable meniscus is set up at the upper end of the slot and a smooth coagulated surface produced. In the steady state this liquid is observed by sampling at the centre of the slot to contain about 5% by weight of N,N'-dimethylformamide. The water supply is sufficient to maintain the slot full of water and also maintain a film of water over the whole surface of the paste layers for the full length of the tray.

In this arrangement the belt is stopped after 35 feet of paste have been spread on the belt and the belt held on the tray with the water supply maintained for at least 70 minutes to complete the coagulation of the polymer to microporous self-supporting form. The wet self-supporting sheet is then stripped from the belt and immersed for 2 hours in water at 60° C to reduce the chloride ion content to 1000 milligrams per square meter or less thus removing substantially all the salt and substantially all the dimethylformamide. The material is then dried at 98° C.

THE METHOD FOR USE WITH THE APPARATUS OF FIG. 1

The polyurethane polymers used were made in solution in dimethylformamide from a polyester by reaction with a diol and a diisocyanate under an inert atmosphere.

The reaction was carried out in pure N,N'-dimethylformamide (139 British Gallons) using 130 parts of an anhydrous adipic acid/ethylene glycol/butane 1:4 diol copolyester having a molecular weight of about 2000 acid value less than 2 and a hydroxyl number of about 53, sold under the Trade Mark DESMOPHEN 2001 (by Bayer) and 28.38 parts of anhydrous butane 1:4 diol and 0.1022 parts of dibutyl tin dilaurate, 108 parts of pure 4,4'-diphenylmethane diisocyanate was then added and the mixture cooled so as to keep the temperature below 50° C. When the reaction was substantially complete additional butane 1:4 diol was added to react with the remaining free isocyanate groups and the temperature held at about 50° C until the viscosity was about 2,900 poise at 24° C. This additional diol was 2.2 parts. Finally 4.7 parts of a 1:1 methanol/N'N-dimethylformamide blend was added to react with any traces of free isocyanate still present. The viscosity at this stage of a sample at 24° C was 3,900 poise, the solids content was 30%, the intrinsic viscosity was 1.04 and the Huggin's slope constant $k$ of the viscosity number plot was 0.37. This solution will be referred to as solution S1.

A sample of solution S1 was then diluted to 15% resin solids and cast in a flat glass reservoir. The solvent was evaporated off slowly over several hours and finally more rapidly under vacuum 50° to give a substantially solvent free transparent film 0.2 millimeters thick.

The ultimate tensile strength was 544 Kg per square centimeter measured by the method described in British Standard Specification No. 3144/1958 using an Instron tensile testing machine.

The notch tear strength was 128 Kg/centimeter.

Table 1 gives the values of certain physical properties of other polymer solutions used in the Examples

TABLE I

| Solution Number | Viscosity poise at 25° C. | Intrinsic Viscosity | Huggin's Slope constant | Resin Solids % | Ultimate tensile strength Kgs/cm$^2$ | Notch tear strength Kg/cm. | Initial modulus (25%) Kgs/cm$^2$ |
| --- | --- | --- | --- | --- | --- | --- | --- |
| S1 | 3900 | 1.04 | 0.37 | 30 | 544 | 128 | 72 |
| S2 | 1960 | 1.08 | | 32 | 646 | | 62 |
| S3 | 2300 | 0.87 | | 32 | 534 | 144 | 62 |
| S4 | 2260 | 1.11 | | 32 | | | |

TABLE I-continued

| Solution Number | Viscosity poise at 25° C. | Intrinsic Viscosity | Huggin's Slope constant | Resin Solids % | Ultimate tensile strength Kgs/cm² | Notch tear strength Kg/cm. | Initial modulus (25%) Kgs/cm² |
|---|---|---|---|---|---|---|---|
| S5 | 3040 | 0.97 | | 32.3 | 675 | 158 | 61 |
| S6 | 2500 | 0.98 | | 31.3 | | | |
| S7 | 3800 | 1.02 | | 33.5 | | | |
| S8 | 2720 | 1.08 | | 31.8 | 727 | 153 | 82 |
| S9 | 2240 | 1.13 | | 32.2 | | | |
| S10 | 2680 | 0.86 | | 32.2 | 627 | 137 | 60 |
| S11 | | 1.06 | | 29.4 | 628 | 147 | 62 |
| S12 | 1620 | 1.0 | | 32.5 | 507 | 161 | 76 |

The notch tear strength was measured on an Instron tensile testing machine using the method described in British Standard Specification No. 2782:3/308A/1965. The specimen is cut with a single stroke of a press using a knife-edge punch with cutting edges of the form and dimensions shown in FIG. 308,108 of the above British Standard.

The jaws of the testing machine are set 5 centimeters apart and the ends of the specimen gripped in the jaws. The jaws are then separated at 100 centimeters per minute and the load at which a tear is initiated at the notch is recorded.

EXAMPLE I

A stabilized topcoat polymer paste containing evenly dispersed microscopic salt particles was made by mixing 121.1 parts of polymer solution S9 with 35.4 parts of N,N'-dimethylformamide 126.4 parts of finely divided sodium chloride and 22.8 parts of a carbon black pigment master batch.

The resultant paste contained 25% resin solids and had a viscosity of 87,000 centipoise at 25° C measured on a Brookfield Viscometer.

The pigment master batch was made by dissolving in 32.2 parts of N,N'-dimethylformamide 2.4 parts of STABAXOL a carbodiimide stabilizer against hydrolysis of the polyurethane, 3.2 parts of CYASORB U.V. 24, namely 2,2'-dihydroxy-4-methoxy-benzophenone, a stabilizer against ultra violet ray degradation of the polyurethane and 0.8 parts of IRGANOX 1010, namely tetrakis [methylene 3-(3',5', ditertiary-butyl-4'-hydroxyphenyl propionate] methane, an antioxident for the polyurethane, and stirring into this 8.0 parts of Rajah Black carbon black pigment and, then mixing in 38.8 parts of the polymer solution SI described above.

The Rajah Black carbon black pigment is made by the channel process by Columbian International and is stated by them to have an average particle size of 0.02 microns, a surface area of 156 square meters per gram, an oil absorption to produce a fluid paste of 11.3 milliliters per gram and to produce a stiff paste of 1.23 milliliters per gram, a carbon content of 95.2%, and a volatile matter content of 4.8%.

The sodium chloride was ground in a pin and disc mill with air classification to separate out fines and return oversize particles for regrinding. The sodium chloride powder before dispersing in the polymer solution typically had an average particle size of the order of 10 to 20 microns usually about 13 to 17 microns with a standard deviation of the order of ± 10 microns. This measurement was made by sedimentation measurements using a Photoextinction Sedimentometer manufactured by Evans ElectroSelenium Ltd., Model No. 41 used in accordance with the manufacturer's instructions based on papers by H. E. Rose in *Engineering* of Mar. 31 and Apr. 14, 1950, and *Nature* of 1952, Volume 169, page 287.

This apparatus consists of a chamber in which the solid whose particle size is to be measured can be dispersed ultrasonically in a liquid and its rate of settling measured optically. The change in transmission of light by the dispersion with time is related to the particle sizes of the particles and the measurements of this change enable the average particle size to be calculated. It will be appreciated that these sedimentometer experiments give an indication of the general order of particle size of the majority of the particles.

Shadow photography of typical samples of the ground salt has indicated that the salt particles have random rough irregular shapes including quite elongated shapes as well as more compact cube or block shapes.

The dispersions typically contain a few particles having a maximum dimension as large as 70 microns but substantially all of the particles are less than 40 to 50 microns, and most are less than 25 to 30 microns im maximum dimension and have dimensions in the range down to 1 micron or so though a few may be even smaller. The salt is also selected to have a low moisture content so that it does not cake, for example less than 0.5% and especially in the range 0.2 –0.4%. It may also have an anticaking agent added namely MICROCAL at about 1% by weight. MICROCAL is a very fine particle size coprecipitated lime and silicate anticaking agent sold by Joseph Crosfield & Sons Ltd. The mixing and milling conditions are preferably carried out at relative humidities less than 70% at 25° C and preferably at about 50%.

A substrate paste was made from a blend of solutions S1 and S2 and was mixed with 1.78 parts per part of resin of microscopic sodium chloride of particle size similar to that used in making the topcoat paste, and a pigment master batch similar to that used for the topcoat paste so that the finished substrate paste contained 0.5% carbon black by weight based on resin.

The paste had a viscosity of 1720 poise at 25° C. The substrate and topcoat pastes were then fed under pressure to the heads 66 and 67 respectively at pump pressures of 62 pounds per square inch and 105 pounds per square inch respectively with a belt speed of 1 foot per minute. The water supply to the spray 60 was mains water at 15° C.

The material had the following physical properties thickness 1.65 millimeters; weight 748 grams per square meter; ultimate tensile strength L 11.0, × 11.8 kgs. per square centimeter, elongation at break L 300%, × 365%; initial modulus (25% extension) L 3.2 Kg. per centimeter, × 2.8 Kg. per centimeter; notch tear strength L 5.3, × 4.8 Kg. per centimeter; pore size 10.5 microns (maximum), 5.5 microns (average), hydrostatic head 106 millimeters of mercury and average density (calculated) 0.45.

These physical properties were measured as described in Belgian Pat. No. 732,482.

EXAMPLES 2 to 6

These were carried out in the same manner as Example 1 apart from the polymer solutions used and the fact that in Example 5 distilled water instead of mains water was used as the non-solvent. Table 2 sets out the polymer solutions used, the viscosities of the pastes, the pump pressures to the extrusion heads, the belt speed and the physical properties of the materials produced, and includes the values for Example 1 for comparison. The units used in Example 1 are also used in the table.

A variety of surface modifying finishes can be applied to the top coat or top surface of a single layer material for example to impart a grain leather like finish.

One very suitable finishing operation is a treatment of the upper surface with fine droplets of a solvent and heating, in a manner to partially collapse the microporous structure along the surface and form a thin fused polyurethane skin thereon; materials so finished often have a series of tiny spaced depressions, partially lined with fused polyurethane material (e.g. about 2 to 15 microns in thickness), at said surface. Another suitable finishing treatment involves applying to the upper surface of the microporous material a thin top coat, such as an aqueous emulsion of a suitable polymer (e.g. an alkyl acrylate polymer or copolymer such as copolymer of butylacrylate with some 15% of acrylonitrile and

TABLE 2

| Example | | 1 | 2 | 3 | 4 | 5 | 6 |
|---|---|---|---|---|---|---|---|
| Substrate paste | | | | | | | |
| Polymer solution | | S2/S1 | S6/S5/S4 | S7/S3 | S7 | S7 | S7/S8 |
| Paste viscosity | | 1720 | 1880 | 1360 | 1620 | 1620 | 1720 |
| Pump pressure psi | | 62 | 70 | 112 | 70 | 70 | 71 |
| Topcoat paste | | | | | | | |
| Polymer slutions | | S9 | S8 | S7/S11/S12 | S2/S10 | S2/S10 | S2/S10 |
| Paste viscosity | | 870 | 1520 | 790 | 670 | 670 | 670 |
| Pump pressure psi | | 105 | 118 | 176 | 53 | 53 | 50 |
| Belt speed | | 1 | 1 | 2 | 1 | 1 | 1 |
| Product | | | | | | | |
| thickness | | 1.65 | 1.55 | 1.66 | 1.96 | 1.93 | 1.81 |
| Weight | | 745 | 667 | 657 | 798 | 756 | 753 |
| Ultimate tensile | L | 11.0 | 9.3 | 9.2 | 11.0 | 10. | 9.6 |
| strength | X | 11.8 | 8.8 | 8.1 | 11.7 | 11.3 | 10.6 |
| Elongation at break | L | 300 | 278 | 313 | 318 | 309 | 291 |
| | X | 365 | 300 | 318 | 340 | 330 | 312 |
| Initial Modulus 25% extension | L | 3.2 | 2.7 | 2.3 | 3.1 | 3.0 | 3.0 |
| | X | 2.3 | 2.6 | 2.2 | 3.2 | 3.1 | 3.3 |
| Notch tear strength | L | 5.3 | 4.5 | 3.8 | 5.3 | 4.8 | 5.4 |
| | X | 4.8 | 4.4 | 4.1 | 5.5 | 5.4 | 5.4 |
| Pore (Av.) size (max.) | | 5.5 10.5 | 5.1 11.1 | 5.1 10.3 | | | |
| Hydrostatic head | | 106 | 95 | 93 | | | |
| Water vapour permeability | | | | | 4740 | 4740 | 4060 |
| Average density (calculated) | | 0.45 | 0.43 | 0.40 | 0.41 | 0.39 | 0.42 |

Water vapour permeability was measured by the method described in British Standard Specification No. 3177/1959, but at 37° C and a nominal humidity gradient of 100% relative humidity.

These materials are all flexible and have a handle and drape closely resembling a high quality calf grain leather. They can easily be made without carbon black and post dyed or different pigments or dyes could be incorporated in the polymer pastes.

They can be given a variety of surface finishes to make them resemble natural leather finishes for example they can be converted to suedes by buffing or sanding and the surface which has in contact with the belt and carries an impression thereof can be rendered similar in appearance to the flesh surface of natural leather by sanding. The surfaces can also be embossed for example by using a patterned foil.

about 1–2% of itaconic acid, which can be cross-linked on heating by the inclusion of unreaformaldehyde condensation product in the emulsion, as is well known in the art); the amount of such polymer may be insufficient to close the pores, or sufficient to provide a very thin layer, less than about one micron in thickness, whereby the appearance of the material is improved without unduly decreasing its ability to transmit water vapour. The top coat may be a continuous layer which imparts a glossy "patent" finish to the material; thus one may apply a conventional organic solvent solution of polyvinyl butyral mixed with solvent soluble melamineformaldehyde resin, and evaporate off the solvent and cure (cross-link) the mixture of these two resins.

The material could also be dyed with conventional dyes for polyurethanes for example before the treatment with solvent spray or the application of the top coat or both.

In yet a further alternative form of colouring treatment a dye is contained in the non-solvent in which the polymer is coagulated. The dye may be an "Irgacet" dye as mentioned above and the non-solvent may be an aqueous alcoholic solution of the dye.

These finished materials can be readily made into shoe uppers and thus into shoes by conventional techniques.

THE APPARATUS SHOWN IN FIG. 2

This consists of an endless conveyor belt 10 of woven polyester fabric as described for FIG. 1 passing around three rollers 12, 13 and 14 and over an inclined tray 11. The tray 11 is arranged beneath the upper part of the conveyor and supports it for a substantial part of its length. The upper end 16 of the tray is on the same level as the top of the uppermost 14 of the three rollers thus providing a horizontal upper stretch 15 of conveyor belt. The lower end 17 of the tray terminates just before the lower roller 12 and an end roller 13 is located at the same level as the roller 12 so that the lower part of the conveyor belt is held in a horizontal plane. The rollers 12, 13 and 14 are arranged to drive the conveyor belt down the tray 11 around the end roller 12 horizontally to and around the roller 13 up at a steep inclined angle and around the roller 14 and thence back to the top 16 of the tray 11. The lower part of the conveyor belt is arranged to be within a tank 20 so that when liquid is placed in the tank the horizontal lower portion of the conveyor belt 10 will be beneath the surface of liquid. The tank 20 also contains rollers 21 and 22 each placed respectively just before the rollers 12 and 13 in the direction of travel of the conveyor belt 10. A guide roller 23 and a dancing roller are located outside the tank 20 together with a rewind reel 25 supported on rollers 26 and 27, roller 26 being driven by a further roller 28.

A pair of calender rollers 30 and 31 are positioned between the rollers 13 and 14 and are arranged to be capable of calendering the conveyor belt to varying degrees.

A pair of extrusion heads 35 and 36 are located at the upper portion 15 of the conveyor 10 so as to be adapted to lay down superimposed layers of polymer paste on the conveyor belt. At the top end of the tray 11 a plate 40 is supported adjustably parallel to the tray 11 so as to provide a slot of adjustable thickness but of substantially greater dimension in the direction of motion of the conveyor than its thickness. The plates extend across the full width of the conveyor. Immediately downstream of the plate in the direction of motion of the conveyor there is arranged a Vyon tube 42 to feed liquid on to the surface of the plate 40 at its downstream edge. Immediately downstream of this Vyon tube there is a further glass plate about eight feet long provided with Vyon feed tube 44 adjacent its upstream edge. Bars and trailing sheets 46 as in the arrangement shown in FIG. 1 are spaced down the rest of the tray. Below the end of each sheet 46 the tray has a transverse drain slot 47. Immediately prior to each bar 45 but downstream of the preceding drain slot there is located an inlet pipe 48. The drained liquid may either be discarded from the slots 47 or fed back to the preceding inlet 48 acting in effect as a counter current.

Preferably pure water is fed in at the end of the tank 20 adjacent the roller 13 and the liquid fed in counter current from the end of the tank adjacent the roller 12 to the lower end of the tray 11. The water fed into the tank is preferably at 40° to 80° C and at the other end of the tank its temperature is about 30° C and its N,N'-dimethylformamide content about 3% by weight. The outflow from the tank is fed to the tray 11 in counter current and the final outflow 47 from the tray 11 is arranged to contain up to about 10% of dimethylformamide which is recovered in a solvent recovery plant. The outflow could easily be arranged to have a higher solvent content but it has been observed that as the solvent content increases in the initial coagulating liquid the coagulated surface tends to be less smooth and can take on a matt appearance.

Measuring means (not shown) are located between the rollers 14 and the extrusion heads 35 between the two extrusion heads 35 and 36 and between the extrusion head 36 and the plate 40 so as to enable control of the thickness of the extruded materials to be achieved. This can be done by measuring either the thickness or the weight of the material passing the measuring means.

The equipment described above can be used to produce a water vapour permeable self-supporting sheet material as follows:

The conveyor belt 10 is set running at the desired speed, e.g. 1 to 5 or 10 preferably 3 to 5 feet per minute, the tank 20 is filled with liquid, for example water, sprays 42 are supplied with liquid for example water, and the pressure between the rollers 30 and 31 is adjusted to give the desired moisture content in the conveyor belt 10. The take-up drive roller 28 is synchronized with the speed of the belt 10. The material which it is wished to coagulate comprising polymer dissolved or dispersed as a colloid or gel in a water miscible organic solvent is fed to one or both of the extrusion heads 35 and 36 depending on whether a single layer film or a double layer film is to be produced. The rate of feed polymer to the heads is adjusted to give the desired thickness or thicknesses, for example in the range 0.3 millimeters to 3.0 millimeters. The film carried on the conveyor belt 10 and adhering to it passes between the plate 40 and the tray 11. The separation of the plate 40 from the top surface of the extruded film is adjusted to be such that a stable meniscus of liquid is established at the upper end of the plate 40. The film on the conveyor thus first comes into contact with the coagulating liquid in a stabilised state and the surface is evenly coagulated. With water, even coagulation is produced when this meniscus of ¼ and preferably 1/16 inch or below in thickness. As the coagulating liquid is absorbed into the film further fresh liquid passes up beneath the plate 40 to replenish the meniscus. The film surface is thus rapidly coagulated and coagulation of the rest of the layer or layers is continued as the conveyor passes beneath the sprays 42 and then under the further stabilised film of coagulating liquid provided by the polyethylene sheet 44. This sheet minimises the production of surface irregularities which are observed to occur when it is not used and the sprayed liquid is merely allowed to run down the surface of the conveyor under gravity. The at least partially coagulated film then passes round the roller 12 and beneath the surface of the liquid in the tank 20. It will be appreciated that the conveyor belt is now uppermost and the film is underneath it. At the rate mentioned above for the conveyor and with the dunk tank 50 feet long the film takes 35 minutes to pass from the roller 12 to the proximity of the roller 21. Within this time sufficient solvent has been displaced from the film for the polymer to be in a self-supporting condition. The leading edge of the film can thus be detached from the conveyor and led round the roller 21 and back through the tank for a further period of 35 minutes during which a substantial proportion, if not all, of the solvent is displaced, depending on the thickness of the layer or layers. The film is then led around the roller 22 out of the tank 20 over the roller 23 under the dancing roller 24 which controls the tension in the self-supporting layer between the rollers 26 and 27 and then on the reel 25 in a clockwise direction under zero tension. The factors of film thickness, the nature of the solvent and coagulating liquid, the conveyor belt speed and the temperature of the liquid in the tank 20 and the length of the tank 20 should preferably be selected to ensure that substantially all of the solvent is displaced from the polymer film but if outside factors make it desirable the process may be run so that some solvent remains and this can easily be removed in a further treatment of the self-supporting sheet material with a solvent miscible nonsolvent for the polymer which may be the same as or different to the coagulating liquid.

In an alternative form of the invention the tray 11 is dispensed with as is the roller 12 and they are replaced by roller arrangements which direct the conveyor belt into the liquid in the tank 20 at a substantially vertical angle. The plate 40 is supported parallel to the direction of entry of the belt into the tank and its upstream edge is arranged to be at a height greater than the maximum ripple height encountered in the tank when running the apparatus. This once more results in a stable meniscus being established which is automatically replenished by surface tension from the body of the liquid in the tank. The length of the plate is adjusted to damp down the motion of the ripples so that the meniscus is held sufficiently stable for a surface free from dunk lines to be produced.

The function of calender rollers 39 and 31 mentioned above will now be described in more detail.

Their function is to control the amount of coagulating liquid retained in the belt when the process is running continuously. It is necessary to do this in order to achieve a balance between the need for sufficient adhesion of the polymer supplied from the extrusion heads to prevent the layers distorting when coagulated and the conflicting need to strip the self-supporting film from the conveyor belt at the roller 21. If too much coagulating liquid remains in the belt 10 the adhesion of the extruded film will be insufficient and the shrinkage produced by the initial coagulation of the top surface of the film at the plate 40 may be such as to cause the edges of the film to separate from the conveyor belt or delaminate. If too little coagulating liquid remained in the belt, the adherence of the coagulated layer to the belt at the time it reaches the roller 21 could be too great and this could cause difficulties. Thus whilst the layer will be self-supporting at this stage it will not yet have achieved the strength which it will have after further treatment and the stripping stage at the roller 21 might even cause damage to the layer.

The particular degree of moisture needed in the belt as it approaches the extrusion heads will vary depending upon the factors mentioned above in connection with the amount of solvent likely to remain in the belt at the end of its passage through the apparatus but a balance can be struck between too great and too slight adhesion by trial and error.

According to a further aspect of the invention a method of making a water vapour permeable polymer sheet material which comprises coagulating at least one surface of a layer of polymer extended with liquid vehicle on a support is characterized in that the method comprises causing continuous relative movement between the layer on the support and at least two bodies of liquid non solvent the sheet being transferred from going in contact with one body to being in contact with another by being lead around guide means in a manner such that its free surface is held out of contact with the said guide means and is prevented from assuming a concave transverse configuration.

Desirably the contact with the bodies of liquid non solvent is carried on for sufficient time to coagulate not only the surface of the layer but also to coagulate the layer to a form in which it can be stripped from the support.

The guide means preferably comprise a large diameter cylindrical or convex guide surface such as a roll. By large diameter is meant a surface having a radius which is many times e.g. 10 to 50 or more times longer than the thickness of the layer on the support.

The layer is preferably also supported as by guides stentors or grips in such a way as to prevent it assuming a convex transverse configuration at least during its contact with the first said body of liquid and preferably throughout the period from its initial contact with the first body of liquid up to the stage at which it can be stripped from the support without rupturing.

The first body of liquid can be established in accordance with the aspect of the invention which uses a close spaced plate described above and this may be most convenient when only low speeds of operation e.g. up to 10 feet per minute are desired to be used. The second or subsequent bodies of liquid can be established in the same manner Alternatively the second body of liquid can be provided by a tank, or bath such as is described with reference to FIG. 2.

Subsequent bodies of liquid if used could conveniently involve the tray and trailing sheet arrangements described with reference to FIG. 7 and whilst the slot and plate entry arrangement might be a convenient way of sealing the entry end of the tray to prevent non solvent spilling out other means such as idler rollers underneath the support or a smooth lip to the tray could be used.

Alternatively the first body of liquid can be provided by a tank or bath of liquid into which the layer on the support can be lead by being passed round guide means with the free surface of the paste away from the guide means so as to have the support uppermost in the tank.

As described above the support can then be held flat by stentors, grips or other means.

The layer on the support would then pass out 25. of the bath around further guide means and up and over a series of one or more trays as described above. The layer once coagulated could be stripped from the support.

The invention also extends to apparatus for coagulating polymer extended with liquid vehicle in sheet form on a support which may be porous or non porous which comprises first means for applying a body of liquid non solvent at least to the free surface of the said sheet second means for applying a separate body of liquid non solvent at least to the free surface of the said sheet, drive means arranged to move the said sheet on the support past the said first and second means in sequence and guide means for transferring the sheet on the support from the first means to the second means in a manner such that the free surface of the layer is held out of contact with the said guide means and is prevented from assuming a concave transverse configuration.

What I claim as my invention and desire to secure by Letters Patent is:

1. A method of making a water vapor permeable polymer sheet material which comprises forming an initial mixture comprising elastomeric thermoplastic polyurethane dissolved in dimethylformamide with microscopic water soluble inorganic salt particles dispersed through the mixture, forming a layer at least 0.5 mm thick of the initial mixture in adherence with an endless porous fabric belt, passing the layer in adherence with said belt into contact with a body of coagulating liquid which is a solvent for said salt while the free surface of said layer is uppermost and has coagulating liquid on and over it and while said layer and belt are so supported as to prevent said layer adhered to said belt from assuming a concave transverse configuration, said layer being in contact with said body for a time sufficient to partially coagulate said layer, said layer adhering to and becoming keyed to said belt, bringing said partially coagulated layer on said belt into contact, with said free surface lowermost, with a second body of coagulating liquid non-solvent which is a solvent for said salt, said belt and layer passing through said second body until said layer is coagulated to self-supporting condition, and then stripping said self-supporting layer in sheet form from said belt, said second body of liquid being situated under said first body of liquid, said layer and belt being transferred from said first body to said second body by leading said belt carrying said adhering layer around guide means in a manner such that said free surface is held out of contact with said guide means and is prevented from assuming a concave transverse configuration.

2. Process as in claim 1 in which said porous fabric is a woven fabric.

3. Process as in claim 2 in which the degree of said keying is such that the force required to effect said stripping is in the range of 50 to 2000 grams per centimeter of width.

4. A method as claimed in claim 3 in which the guide means comprise a large diameter cylindrical or convex guide surface such as a roll.

* * * * *